United States Patent
Bae et al.

(10) Patent No.: US 7,102,629 B2
(45) Date of Patent: Sep. 5, 2006

(54) SYSTEM AND METHOD FOR DIGITAL VIDEO SIGNAL TRANSMISSION

(75) Inventors: Cheon-ho Bae, Daeku (KR); Yong-sub Kim, Seoul (KR)

(73) Assignee: Samsung Electronics, Co., Ltd., (KR)

( * ) Notice: Subject to any disclaimer, the term of this patent is extended or adjusted under 35 U.S.C. 154(b) by 331 days.

(21) Appl. No.: 10/233,810

(22) Filed: Sep. 3, 2002

(65) Prior Publication Data

US 2003/0043141 A1 Mar. 6, 2003

(30) Foreign Application Priority Data

Sep. 6, 2001 (KR) ................................. 2001-54774

(51) Int. Cl.
*G09G 5/00* (2006.01)
(52) U.S. Cl. ...................... 345/204; 370/412; 398/168
(58) Field of Classification Search ........ 345/211–213, 345/87, 204, 156; 709/231; 341/59; 370/412; 398/168

See application file for complete search history.

(56) References Cited

U.S. PATENT DOCUMENTS

| | | | | |
|---|---|---|---|---|
| 4,338,597 A | * | 7/1982 | Steiner et al. ............... | 345/213 |
| 5,926,172 A | * | 7/1999 | Hanley ........................ | 345/210 |
| 5,974,464 A | * | 10/1999 | Shin et al. .................... | 709/231 |
| 6,181,300 B1 | * | 1/2001 | Poon et al. ................... | 345/698 |
| 6,604,219 B1 | * | 8/2003 | Lee et al. ..................... | 714/769 |
| 2002/0048323 A1 | * | 4/2002 | Kang et al. ............. | 375/240.27 |
| 2002/0126574 A1 | * | 9/2002 | Downey et al. ............... | 367/14 |

OTHER PUBLICATIONS

NEC Corporation, "TFT Color LCD Module," Data Sheet, NL10276BC20-04, pp. 1-23, www.displaze.charitydays.co.uk/PDF/LCD/NEC/10276BC20-04.pdf.
NEC Corporation, "TFT Color LCD Module," Data Sheet, NL6448BC20-08, pp. 1-24, www.displaze.charitydays.co.uk/PDF/LCD/NEC/642008.pdf.
NEC Corporation, "TFT Color LCD Module," Data Sheet, NL128102BC23-03, pp. 1-25, www.displaze.charitydays.co.uk/PDF/LCD/NEC/128102BC23-03.pdf.

* cited by examiner

*Primary Examiner*—Richard Hjerpe
*Assistant Examiner*—Kimnhung Nguyen
(74) *Attorney, Agent, or Firm*—Mills & Onello LLP

(57) ABSTRACT

In a video signal transmission system and method, a video signal and a pre-defined synchronization signal, generated according to the logic status of first control signals, are converted into first DC-balanced data and second DC-balanced data, respectively. The first data and second data are converted into a first serial data stream and a second serial data stream, respectively, and the data streams are transmitted over a first channel. Third data and fourth data are detected by correcting skew of the first serial data stream and the second serial data stream received through the first channel. The first data is encoded and transmitted so that the second data and the third data are not the same. The first serial data stream is transmitted over the first channel in response to an activated second control signal, while the second serial data stream is transmitted over the first channel in response to a deactivated second control signal.

15 Claims, 17 Drawing Sheets

| HSYNC | VSYNC | SYNCHRONIZATION CODE | DSYNC |
|---|---|---|---|
| 0 | 0 | 10000111 | 110000111 |
| 0 | 1 | 10001011 | 110001011 |
| 1 | 0 | 10010011 | 110010011 |
| 1 | 1 | 10100011 | 110100011 |

FIG. 8

| B[7:0] | DSB'=OUT[8:0] | RECEIVER의 DESERIALIZED 11BIT | | | | | | | | | |
|---|---|---|---|---|---|---|---|---|---|---|---|
| 11000011 | 011000011 | x | 0 | 1 | 1 | 0 | 0 | 0 | 0 | 1 | 1 | x |
| 11110001 | 100001110 | 1 | 1 | 0 | 0 | 0 | 0 | 1 | 1 | 1 | 0 | x |
| 11000101 | 011000101 | x | 0 | 1 | 1 | 0 | 0 | 0 | 1 | 0 | 1 | x |
| 11101001 | 100010110 | 1 | 1 | 0 | 0 | 0 | 1 | 0 | 1 | 1 | 0 | x |
| 11001001 | 011001001 | x | 0 | 1 | 1 | 0 | 0 | 1 | 0 | 0 | 1 | x |
| 11011001 | 100100110 | 1 | 1 | 0 | 0 | 1 | 0 | 0 | 1 | 1 | 0 | x |
| 11010001 | 011010001 | x | 0 | 1 | 1 | 0 | 1 | 0 | 0 | 0 | 1 | x |
| 10111001 | 101000110 | 1 | 1 | 0 | 1 | 0 | 0 | 0 | 1 | 1 | 0 | x |

ALIGNED 9 BIT DATA

MSB OF FOLLOWING DATA

DSR, DSG OR DSB

LSB OF PREVIOUS DATA

FIG. 10

| B[7:0] | SDSB |
|---|---|
| 11000011 | 100111100 |
| 11110001 | 011110001 |
| 11000101 | 100111010 |
| 11101001 | 011101001 |
| 11001001 | 100110110 |
| 11011001 | 011011001 |
| 11010001 | 100101110 |
| 10111001 | 010111001 |

SYSTEM AND METHOD FOR DIGITAL VIDEO SIGNAL TRANSMISSION

BACKGROUND OF THE INVENTION

1. Field of the Invention

The present invention relates to a system and a method for signal transmission, and more particularly, to a system and a method for generating and transmitting encoded DC-balanced data so that DC-balanced data and DC-balanced synchronization codes (DSYNC) are not the same following transmission via a communication link (hereinafter referred to as "channel").

2. Description of the Related Art

Modern LCD monitors employ an interface that transmits data using optical fiber in order to reduce EMI (electromagnetic interference) and transmission line noise caused by transmission cables.

DC balance is needed in a data transmission system which utilizes optical fiber. Thus, an interface that adopts optical fiber uses a signal transmission approach that achieves transmission of a DC-balanced signal. As is well known in the relevant industry, DC balance is a balance between a 'High' logic value and a 'Low' logic value of each data bit of a digital data transmission.

FIG. 1 is a high-level block diagram of a conventional signal transmission system that uses 5 channels. The signal transmission system 10 shown in FIG. 1 uses a signal transmission approach (hereinafter referred to as 8B/9B) which encodes 8 bits into 9 bits, and includes a controller 2, a transmitter 4, a receiver 6, an LCD panel 8 and five channels 1, 3, 5, 7 and 9. FIG. 2 is a timing diagram of output signals of a typical video controller.

As shown in FIGS. 1 and 2, the controller 2 outputs a red video signal (R[7:0]), a green video signal (G[7:0]), a blue video signal (B[7:0]), a horizontal synchronization signal (HSYNC), a vertical synchronization signal (VSYNC), a data enable signal (DE) and a clock signal (CLK) to the transmitter 4. Each of the red, green and blue video signals (R[7:0], G[7:0] and B[7:0]) includes 8-bit data.

FIG. 3 shows output signals of the transmitter of FIG. 1. As shown in FIGS. 1 and 3, the transmitter 4 transmits DC-balanced data (DCBR, DCBG, DCBB and SYNC) over four channels 1, 3, 5 and 7 to the receiver 6. The transmitter 4 sends the CLK over channel 9 to the receiver 6.

Here, the DC-balanced data (DCBR, DCBG and DCBB) indicates the encoded video signals (R[7:0], G[7:0] and B[7:0]) respectively and DC-balanced synchronization signal SYNC indicates the encoded 8-bit synchronization signal. The 8-bit synchronization signal is generated according to the logic values of both HSYNC and VSYNC. The DC-balanced data (BCBR, DCBG and DCBB) and SYNC are serialized and output to the receiver 6.

In response to the DC-balanced data (DCBR, DCBG and DCBB), SYNC and CLK, the receiver 6 demodulates the red, green and blue video signals (R[7:0], G[7:0] and B[7:0]), HSYNC, VSYNC and DE. Then, the receiver 6 outputs the demodulated signals to the LCD panel 8.

The LCD panel 8 receives the red, green and blue video signals (R[7:0], G[7:0] and B[7:0]), HSYNC, VSYNC, DE and CLK, and then displays video signals.

Since the conventional data transmission system (10) cannot combine the DC-balanced data (DCBR, DCBG and DCBB) and SYNC, it uses channels 1, 3 and 5 to transmit the DC-balanced data (DCBR, DCBG and DCBB) and channel 7 to transmit the SYNC signal.

The data rate (or data transfer rate) of the conventional data transmission system 10 is determined by the number of data transmission channels (excluding the channel that transmits CLK)×bit stream×operation frequency (MHz).

Therefore, the data rate of the Super Extended Graphic Array (SXGA) that runs at 112 MHz is about 4 Gbps (4×9×112 (MHz)). The high data rate is a disadvantage of the existing signal transmission system 10 which uses 4 channels (excluding the channel that transmits CLK).

SUMMARY OF THE INVENTION

To address the above limitations, it is an object of the present invention to provide a system and a method for transmitting the DC-balanced data and DSYNC over a single channel, and generating and transmitting the encoded DC-balanced data so that the DC-balanced data and DC-balanced synchronization signal SYNC are not the same.

To achieve the above object, a video signal transmission method includes: encoding a video signal and a pre-defined synchronization signal generated according to the logic status of first control signals into first DC-balanced data and second DC-balanced data, respectively; converting the first data and the second data into a first serial data stream and a second serial data stream, respectively, and transmitting the data streams over a first channel; detecting third data and fourth data by correcting skew of the first serial data stream and the second serial data stream received through the first channel; and encoding and transmitting the first data so that the second data and the third data are different.

The first serial data stream is transmitted over the first channel in response to a activated second control signal, while the second serial data stream is transmitted over the first channel in response to a deactivated second control signal. The video signals and the pre-defined synchronization signal include N bits (where N is a natural number). The first data through the fourth data each includes (N+M) bits (where M is a natural number). The video signal transmission method includes further: decoding the third data and the fourth data, and detecting the first data, the second data, the first control signals and the second control signal.

When the third data is detected, the second control signal is activated, while when the fourth data is detected, the second control signal is deactivated.

To achieve the above object, a data transmission method includes: converting multiple first data and multiple second data into consecutive serial data streams and transmitting the streams over a first channel; correcting skew of the serial data streams received over the first channel, and detecting third data; and converting and transmitting each of the multiple first data so that the third data and each of the multiple second data are different.

The first data is transmitted over the first channel in response to an activated control signal and the second data is transmitted over the first channel in response to a deactivated control signal. It is preferable that the first data through the third data include (N+M) bits (where N and M are natural numbers).

The video signal transmission method further includes: decoding the third data and detecting each of the first data, the second data and control signals. If each of the third data is the same as each of the multiple first data, the control signal remains activated. If each of the third data is the same as each of the second data, the control signal remains deactivated.

To achieve the above object, a video signal transmission system includes: an encoding circuit for encoding a video signal and a pre-defined synchronization signal generated, according to the logic status of first control signals, into first DC-balanced data and second DC-balanced data, respectively; a converting circuit for converting first data and second data into a first serial data stream and a second serial data stream respectively; a first channel for transmitting the first serial data stream and the second serial data stream; and a detection circuit for detecting third data and fourth data by correcting skew of the first serial data stream and the second serial data stream received through the first channel.

The encoding circuit encodes the first data so that the second data and the third data are different.

The first serial data stream is transmitted over the first channel in response to an activated second control signal while the second serial data stream is transmitted over the first channel in response to a deactivated second control signal.

The video signal transmission system includes further: a decoding circuit for decoding the third data and the fourth data and detecting the first data, the second data, the first control signals and the second control signal. If the third data is detected, the second control signal is activated while if the fourth data is detected, the second control signal is deactivated.

It is preferable that the video signal and the pre-defined synchronization signal include N bits (where N is a natural number.) and the first data through the fourth data each include (N+M) bits (where M is a natural number.).

BRIEF DESCRIPTION OF THE DRAWINGS

The above object and advantages of the present invention will become more apparent by describing in detail preferred embodiments thereof with reference to the attached drawings in which:

FIG. 8 shows the case where the DC-balanced data and DC-balanced synchronization signal are the same;

FIG. 10 is a table that shows DC-balanced data generated by the encoding algorithm shown in FIG. 9;

DETAILED DESCRIPTION OF PREFERRED EMBODIMENTS

The above object and advantages of the present invention will become more apparent by describing in detail preferred embodiments thereof with reference to the attached drawings. The configuration and operation of the invention will be described in detail with reference to the drawings. Like reference symbols refer to like elements throughout the drawings.

Figure 1:
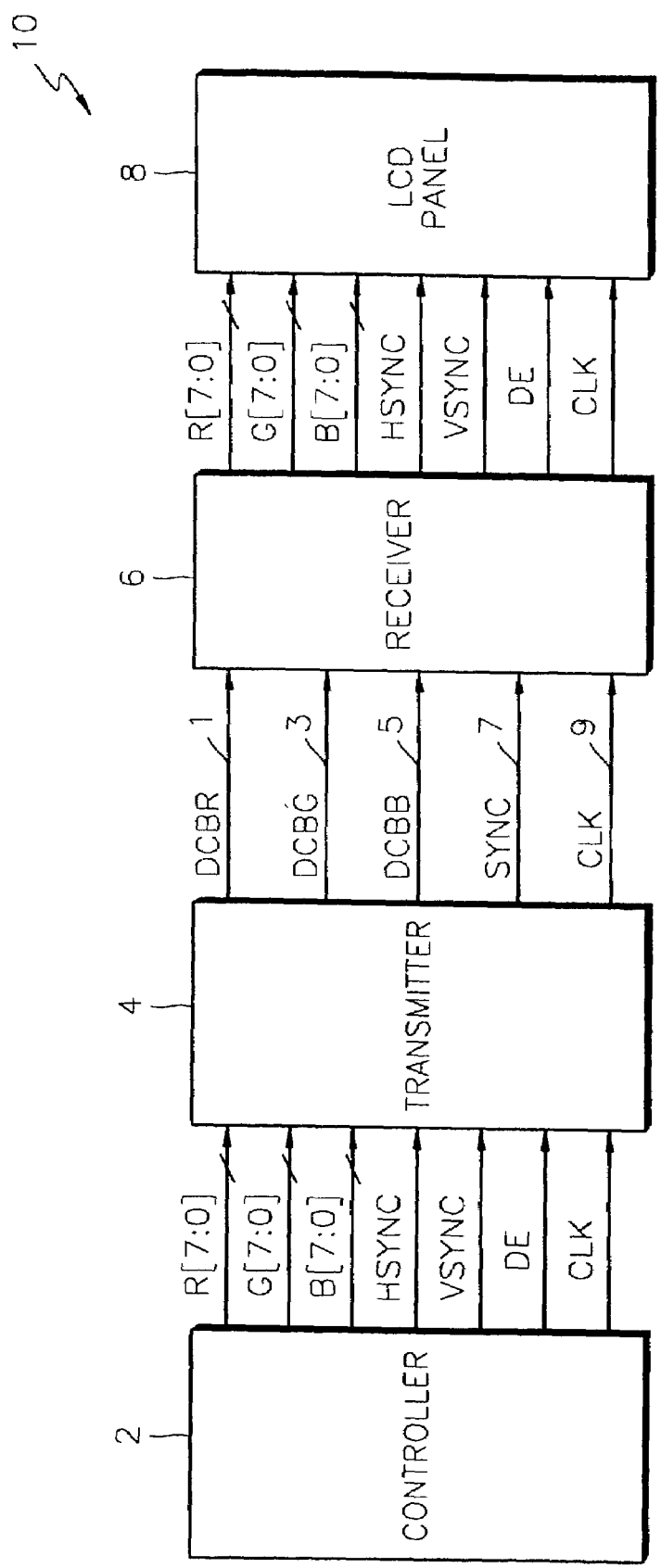
FIG. 1 is a high-level block diagram of a conventional signal transmission system that employs five channels.
Figure 2:
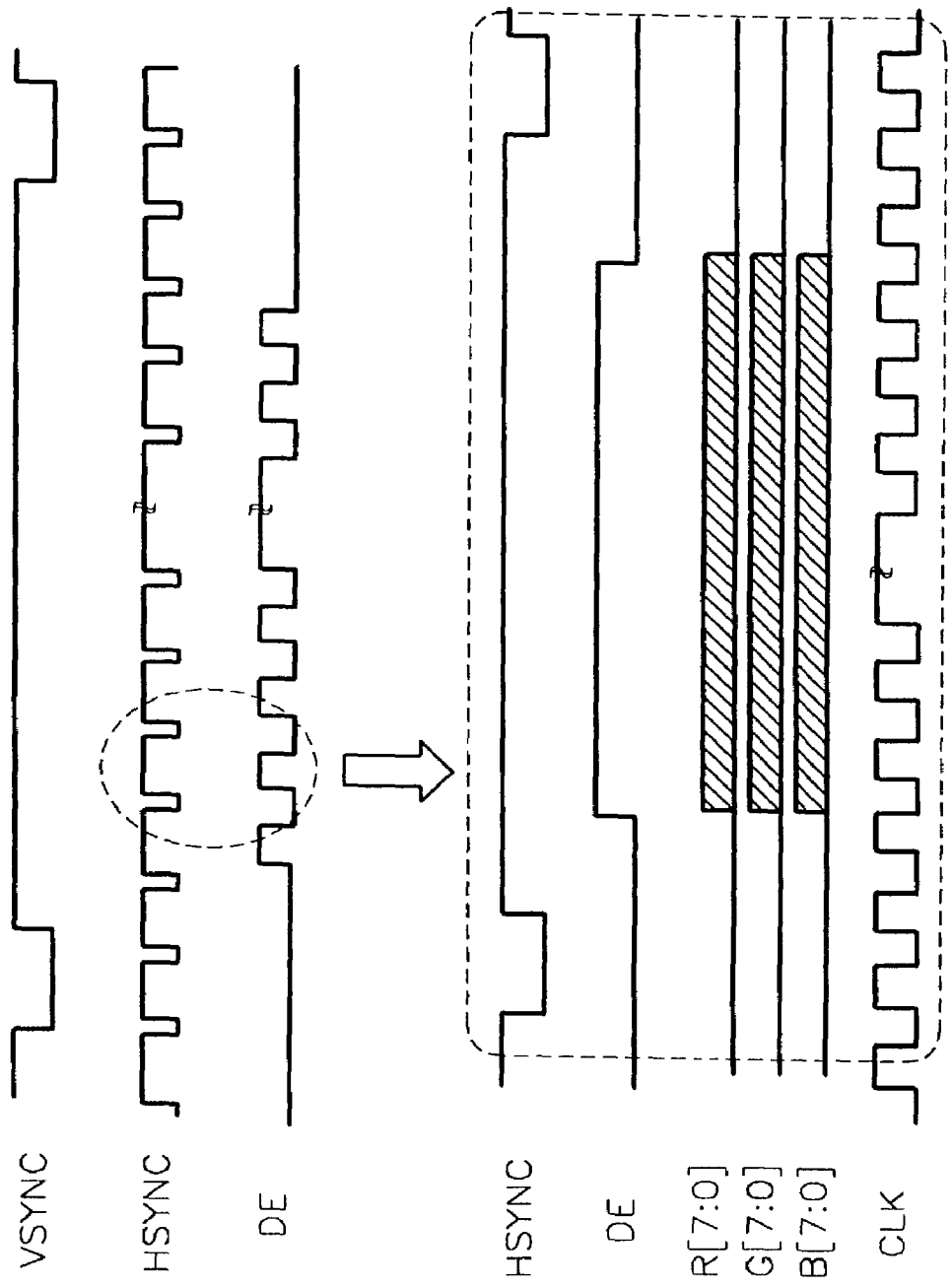
FIG. 2 is a timing diagram of output signals of a typical video controller for th system of FIG. 1.
Figure 3:
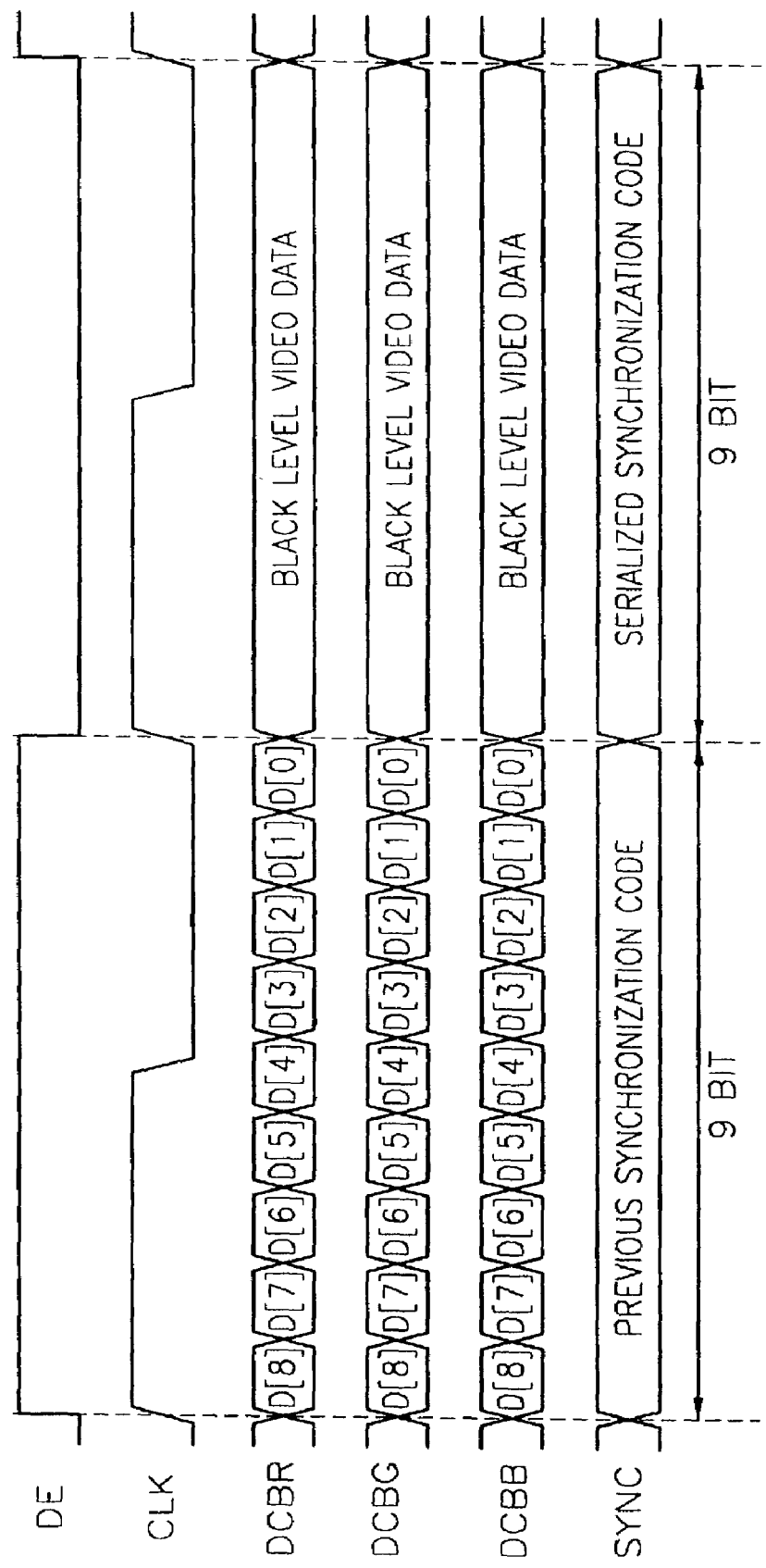
FIG. 3 shows output signals of the transmitter shown in FIG. 1.
Figure 4:
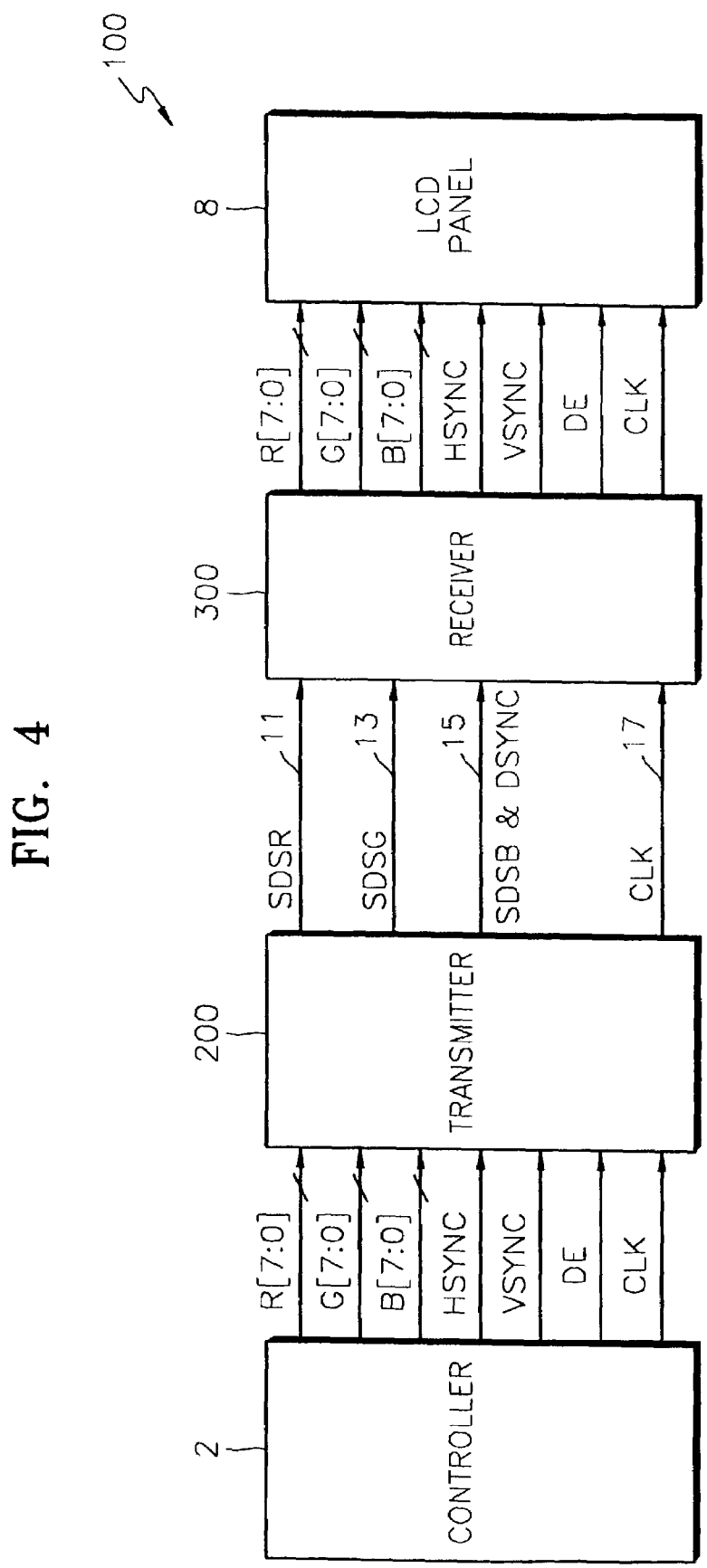
FIG. 4 is a high-level block diagram of a signal transmission system that uses four channels according to one embodiment of the present invention.

FIG. 4 is a high-level block diagram of a signal transmission system according to one embodiment of the present invention. As shown in FIG. 4, the signal transmission system 100 includes a controller 2, a transmitter 200, a receiver 300, an LCD panel 8, and four channels 11, 13, 15 and 17. Since the output signals of the controller 2 and the input signals of the LCD panel 8 are the same as those shown in FIGS. 1 and 2, a detailed explanation thereof will be omitted.

In response to the red video signal (R[7:0]), the green video signal (G[7:0]), the blue video signal (B[7:0]), the control signals (HSYNC, VSYNC, DE) and the clock signal (CLK), the transmitter 200 outputs DC-balanced red, green and blue data (SDSR, SDSQ and SDSB) and a CLK signal to the receiver 300. That is, the transmitter 200 encodes eight bits 8B into nine bits 9B.

The control signals include a horizontal synchronization code (HSYNC), a vertical synchronization signal (VSYNC) and a data enable signal (DE). The transmitter 200 outputs the DC-balanced red, green or blue data (SDSR, SDSG, and SDSB) over each channel 11, 13 or 15 to the receiver 300.

In addition, the transmitter 200 converts a pre-defined synchronization signal, defined according to the status of HSYNC and VSYNC, into a DC-balanced synchronization signal DSYNC, and outputs DSYNC over channel 15 to the receiver 300. That is, the transmitter 200 outputs the DC-balanced blue data (SDSB) and DSYNC over one channel 15 to the receiver 300.

Figures 5, 6:
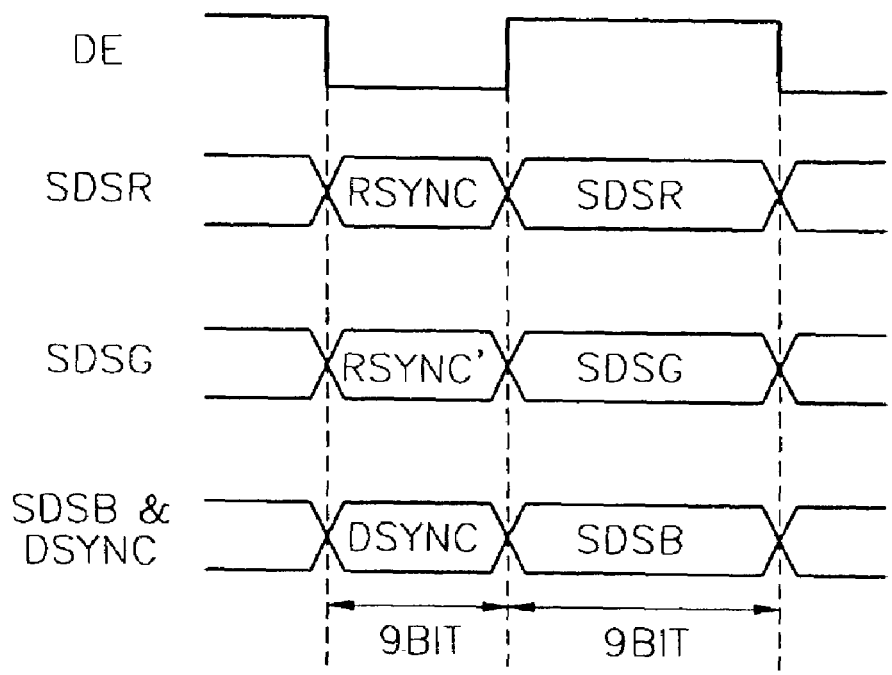
FIG. 5 is a timing diagram showing the wave form of DC-balanced data transmitted through each channel.
FIG. 6 is a table that shows a synchronization code and a DC-balanced synchronization code according to an embodiment of the present invention.

FIG. 5 is a timing diagram showing the wave form of the DC-balanced data transmitted over each channel. As shown in FIGS. 4 and 5, each of the DC-balanced red, green or blue data (SDSR, SDSB or SDSB) is transmitted to the receiver over each channel 11, 13 or 15, in response to an activated DE. The DC-balanced synchronization signal DSYNC is transmitted to the receiver 300 over the channel 15 in response to a deactivated data enable signal DE.

FIG. 4 shows DSYNC transmitted to the receiver 300 over channel 15 with the SDSB signal. However, in other embodiments equally applicable to the present invention the DSYNC can alternatively be transmitted to the receiver 300 over channel 11 with the SDSR signal or 13 with the SDSG signal.

According to an embodiment of the present invention, when three channels are used (excluding the channel that transmits the CLK signal), the data rate is reduced. For example, the data rate of the conventional SXGA that runs at 112 MHz is about 4 Gbps. However, the comparable data rate according to the embodiment of the present invention is 3.4 Gbps.

FIG. 6 shows a synchronization code and a DSYNC signal according to the embodiment of the present invention. The synchronization code is 8-bit data generated according to the status of HSYNC and VSYNC. When the DC balance is considered, the disparity of the synchronization code is 0. The synchronization code shown in FIG. 6 shows one embodiment, and variations of the synchronization code are equally applicable.

In FIG. 6, the status of HSYNC and VSYNC is 0 and 0, respectively, and the synchronization code is 10000111. When the status of HSYNC and VSYNC is 1 and 1, respectively, the synchronization code is 10100011.

DSYNC includes 9 bits. A "1" is concatenated to the front of the MSB of the synchronization code so that DC-balanced red, green or blue data (SDSR, SDSG, SDSB) and DSYNC are not the same. Therefore, the DSYNC of the synchronization code (10000111) is 110000111 while the DSYNC of the synchronization code (10100011) is 110100011.

Figure 7:
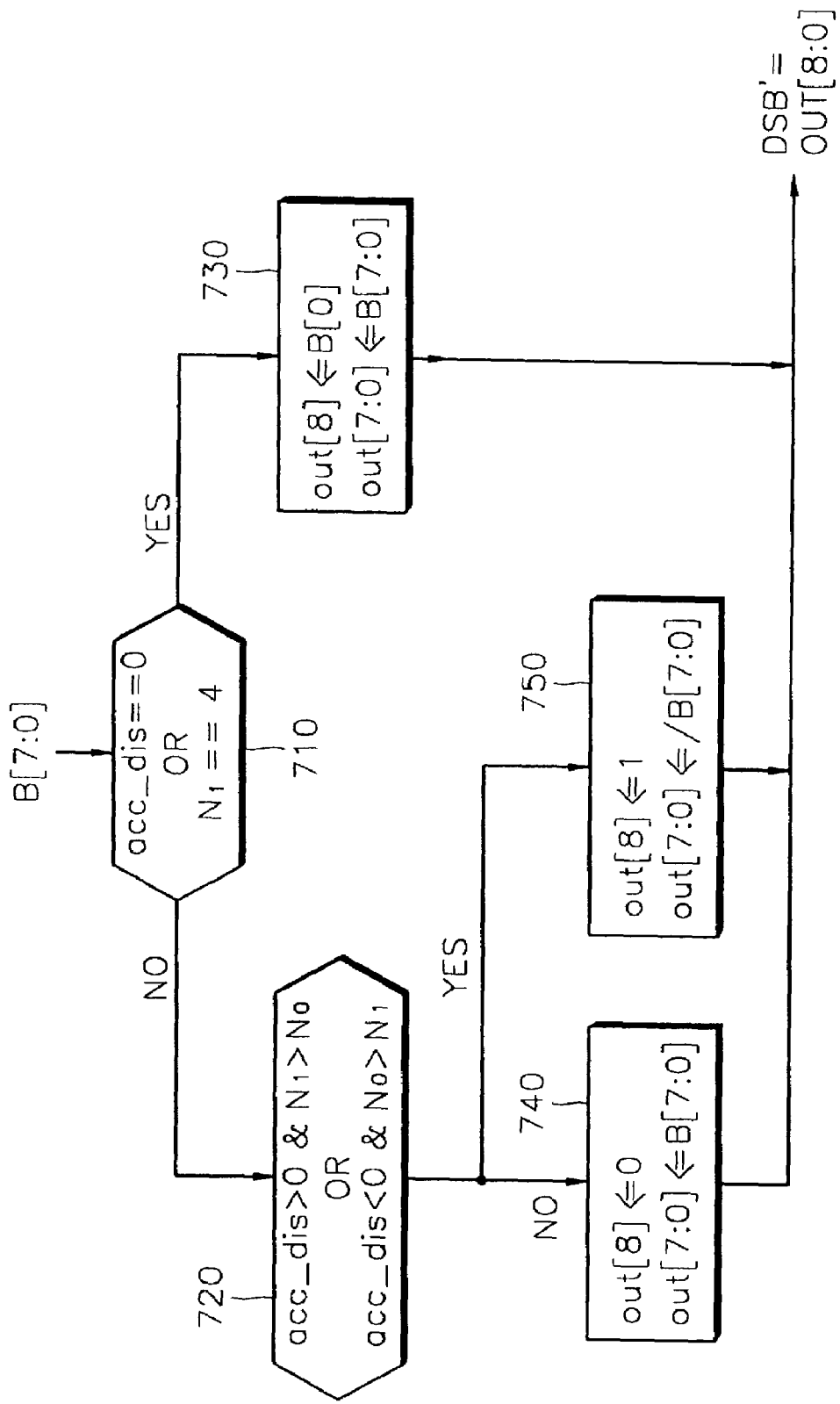
FIG. 7 is a flow chart relating to the generation of the DC-balanced data.

FIG. 7 is a flow chart relating to generation of the DC-balanced data.

FIG. 8 shows the case where the DC-balanced data and DSYNC are the same. As shown in FIGS. 7 and 8, in stage 710, it is judged whether the accumulated disparity (ACC_DIS) is 0 or the number (N1) of 1s included in the input signal (B[7:0]) is 4. If the judgement result of the stage 710 is YES, then stage 730 is performed. If the judgement result of the stage 710 is NO, then stage 720 is performed.

In the stage 720, it is judged whether the accumulated disparity (ACC_DIS) is greater than 0 and the number (N1) of 1s included in the input signal (B[7:0]) is greater than the number (N0) of 0s included in the input signal (B[7:0]), or whether the accumulated disparity (ACC_DIS) is less than 0 and the number (N1) of 1s included in the input signal (B[7:0]) is less than the number (N0) of 0s included in the input signal (B[7:0]). If the judgement result of the stage 720 is YES, then stage 750 is performed. If the judgement result of the stage 720 is NO, then stage 740 is performed.

For example, if the input signal (B[7:0]) is 11000011, then since the judgement result of the stage 710 is YES, 11000011 is output as 011000011 according to the conditions of the stage 730. That is, the DC-balanced data (DSB') of 11000011 is 011000011.

In addition, if the input signal (B[7:0]) is 11110001, then since the judgement result of the stage 710 is NO, 11110001 is judged by the conditions of the stage 720. Because the judgement result of the stage 720 is YES, 11110001 is output as 100001110 according to the conditions of the stage 750. In the drawings, the prefix "/" refers to an inverted signal. That is, the DC-balanced data (DSB') of 11110001 is 100001110.

The receiver 300 shown in FIG. 4 generates 11 bits including the DC-balanced data (DSB'), the LSB of the previous data and the MSB of the following data, in order to correct skew of the DC-balanced data (DCB') as shown in FIG. 8. In the deserialized 11-bit data generated in the procedure, 9-bit data may be the same as the DSYNC data.

For example, if the input signal (B[7:0]) is 11000011, then the DC-balanced data (DSB') generated in FIG. 7 is 011000011. Therefore, the deserialized 11-bit data of the DC-balanced data (DSB') may be X0110000111, and 110000111 can be generated in X0110000111.

As a result, in the case where the DC-balanced data (DSB') and DSYNC are the same, the receiver 300 cannot discriminate the DC-balanced data (DSB') from DSYNC data. A process for solving this problem according to one embodiment of the present invention is illustrated in FIG. 9.

Figure 9:
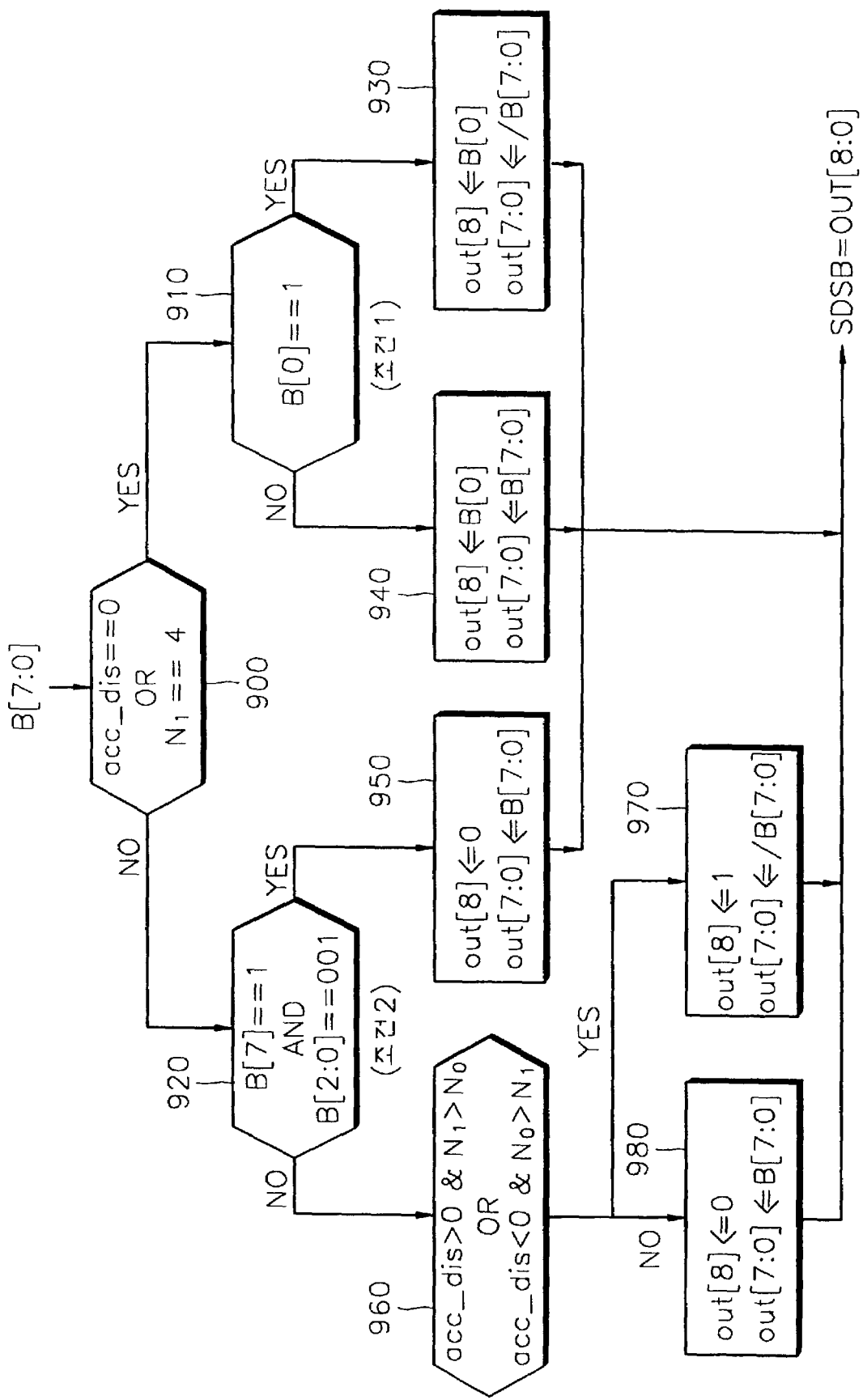
FIG. 9 is an encoding algorithm according to one embodiment of the present invention.

FIG. 9 is an encoding process according to one embodiment of the present invention. FIG. 10 shows the DC-balanced data generated by the encoding process shown in FIG. 9. In FIG. 9, in stage 900, it is judged whether the accumulated disparity (ACC_DIS) is 0 or whether the number (N1) of 1s included in the input signal (B[7:0]) is 4. If the judgement result of stage 900 is YES, then stage 910 is performed. If the judgement result of stage 900 is NO, then stage 920 is performed.

In stage 910, it is judged whether the LSB (B[0]) of the input signal (B[7:0]) is 1. If the judgement result of stage 910 is YES, then stage 930 is performed. If the judgement result of stage 910 is NO, then stage 940 is performed.

In stage 920, it is judged whether the MSB (B[7]) of the input signal (B[7:0]) is 1 and 3 bits (B[2:0]) 001 appear in the input signal (B[7:0]). If the judgement result of stage 920 is YES, then stage 950 is performed. If the judgement result of stage 920 is NO, then stage 960 is performed.

In stage 960, it is judged whether the accumulated disparity (ACC_DIS) is bigger than 0 and the number (N1) of 1s included in the input signal (B[7:0]) is bigger than the number (N0) of 0s included in the input signal (B[7:0]), or whether the accumulated disparity (ACC_DIS) is smaller than 0 and the number (N1) of 1 s included in the input signal (B[7:0]) is smaller than the number (N0) of 0s included in the input signal (B[7:0]).

If the judgement result of the stage 960 is YES, then stage 970 is performed. If the judgement result of the stage 960 is NO, then stage 980 is performed.

With reference to FIGS. 9 and 10, the DC-balanced data (SDSB) generated by the encoding process according to one embodiment of the present invention will be described in detail. If the input signal (B[7:0]) is 11000011, then the judgement results of both stages 900 and 910 are YES. Therefore, 11000011 is converted into 100111100 according to the conditions of stage 930. That is, the DC-balanced data (SDSB=OUT[8:0]) of 11000011 is 100111100.

In addition, if the input signal (B[7:0]) is 11110001, then the judgement results of stage 900 and stage 920 are NO and YES, respectively. Therefore, an input of 11110001 is converted into 011110001 according to the conditions of stage 950. That is, the DC-balanced data (SDSB=OUT[8:0]) of 11110001 is 011110001. The input signals (B[7:0]) shown in FIG. 10 are converted into the DC-balanced data (SDSB=OUT[8:0]) by the encoding process of FIG. 9.

As shown in FIG. 10, even though the receiver 300 converts the DC-balanced data (SDSB=OUT[8:0]) into deserialized data, the converted data and DSYNC shown in FIG. 6 are not the same. Therefore, when the encoding process according to the present invention is used, the DC-balanced data (SDSB) and DSYNC can be transmitted over one channel 15.

Figure 11:
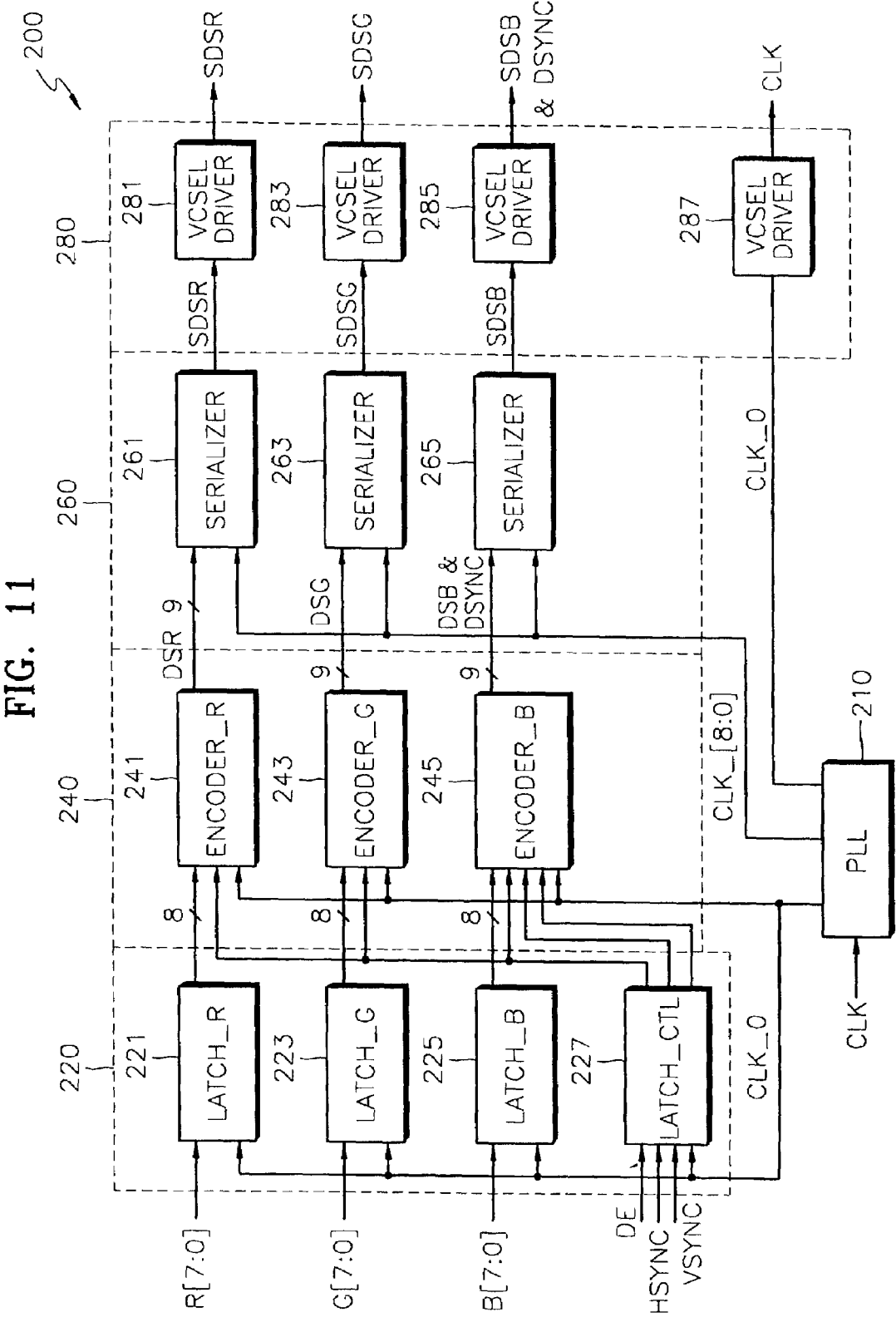
FIG. 11 is a circuit diagram of the transmitter shown in FIG. 4.
Figure 12:
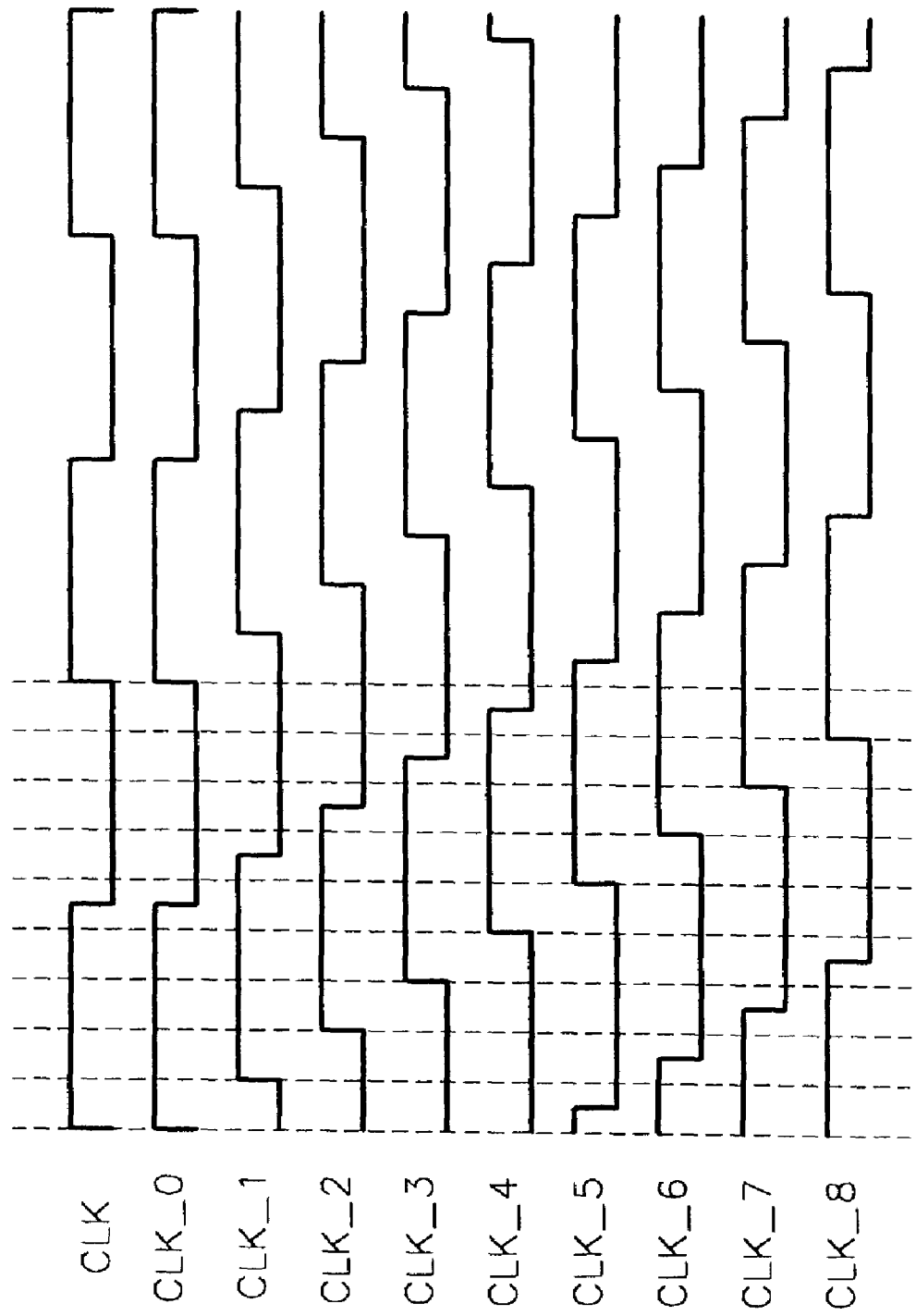
FIG. 12 is a timing diagram showing the wave forms of the input and outputs of the phase locked loop (PLL)

FIG. 11 is a circuit diagram of the transmitter shown in FIG. 4. In FIG. 11, the transmitter 200 includes a phase locked-loop (PLL) 210, a latch circuit 220, an encoding circuit 240, a serializer circuit 260, and a driver circuit 280. FIG. 12 is a timing diagram showing the wave forms of the input and outputs of the PLL 210.

With reference to FIGS. 11 and 12, the PLL 210 outputs multi-phase clock signals (CLK_[8:0]) in response to CLK.

The latch circuit 220 includes a first latch 221, a second latch 223, a third latch 225 and a fourth latch 227. The latches 221, 223 and 225 latch the video signals (R[7:0], G[7:0], B[7:0]), respectively, in response to the clock signal (CLK_0). The fourth latch 227 latches DE, HSYNC and VSYNC in response to the clock signal (CLK_0).

The encoding circuit 240 includes a first encoder 241, a second encoder 243 and a third encoder 245. The encoders 241, 243 and 245 encode input signals (R[7:0], G[7:0], B[7:0]) into DC-balanced data (DSR, DSG, DSB), respectively, according to the encoding algorithm of FIG. 9.

That is, the first encoder 241 encodes or converts the output signal of the first latch 221 into the DC-balanced data (DSR) in response to the clock signal (CLK_0). The second encoder 243 encodes the output signal of the second latch 223 into the DC-balanced data (DSG) in response to the clock signal (CLK_0).

The third encoder 245 encodes the output signals of the third latch 225 or the fourth latch 227 into the DC-balanced data (DSB) or DSYNC in response to the clock signal (CLK_0). Therefore, if the encoding circuit 240 uses the algorithm shown in FIG. 9 and DSYNC is as shown in FIG. 6, then DSYNC and the output signal (DSB) of the encoder 245 cannot be the same.

The serializer circuit 260 includes a first serializer 261, a second serializer 263 and a third serializer 265. The first serializer 261 converts the DC-balanced data (DSR) into a serial data stream (SDSR) in response to clock signals (CLK_[8:0]). The second serializer 263 converts the DC-balanced data (DSG) into a serial data stream (SDSG) in response to clock signals (CLK_[8:0]).

The third serializer 265 converts the combined DC-balanced data (DSB) and the DSYNC data into the serial data stream (SDSB) in response to clock signals (CLK_[8:0]).

The driver circuit 280 includes multiple drivers 281, 283, 285 and 287. It is preferable that the multiple drivers 281, 283, 285 and 287 are Vertical Cavity Surface Emitting Lasers (VCSEL). The drivers 281, 283 and 285 transmit the serial data streams (SDSR, SDSG, SDSB) converted into optical signals to the receiver 300 through the optical fiber.

Figure 13:
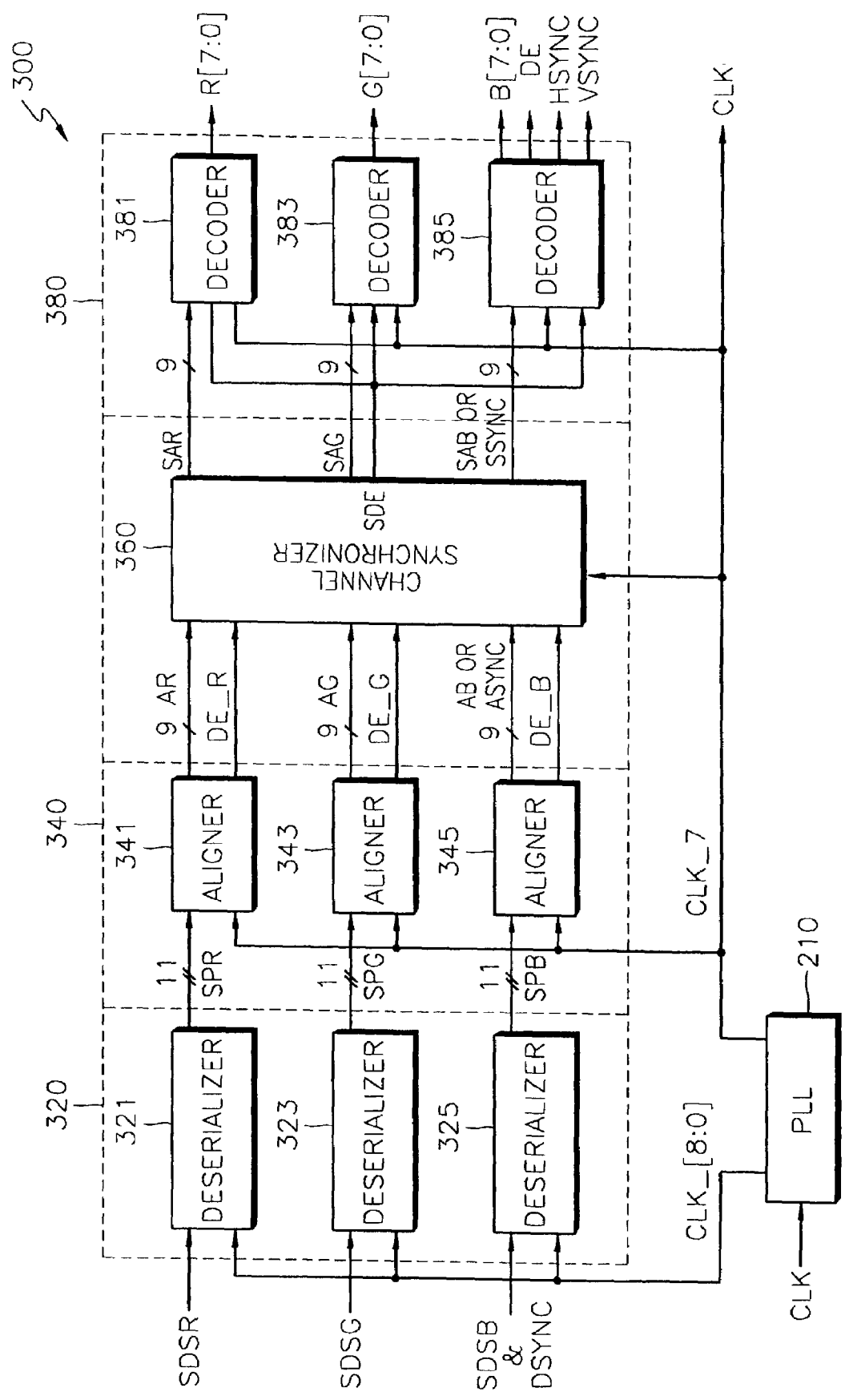
FIG. 13 is a circuit diagram of the receiver shown in FIG. 4.

FIG. 13 is a circuit diagram of the receiver shown in FIG. 4. As shown in FIG. 12, the receiver 300 includes a PLL 210, a deserializer circuit 320, an aligner 340, a channel synchronizer circuit 360, and a decoding circuit 380.

The deserializer circuit 320 outputs 11-bit parallel data in order to correct the skew of (+)1 bit or (−) 1 bit of the received serial data streams (SDSR, SDSG, SDSB). For the sake of discussion, it is assumed that the DSYNC data and the DC-balanced data (SDSB) are transmitted via channel 15. The deserializer 325 will therefore be described in detail.

The deserializer 325 outputs 11 bits (SPB) including the serial data stream (SDSB), the LSB of the previous data of the serial data stream (SDSB) and the MSB of the following data of the serial data stream (SDSB) data to the aligner 345, in order to correct the skew between the received serial data stream (SDSB) and the CLK signal.

Figure 14:
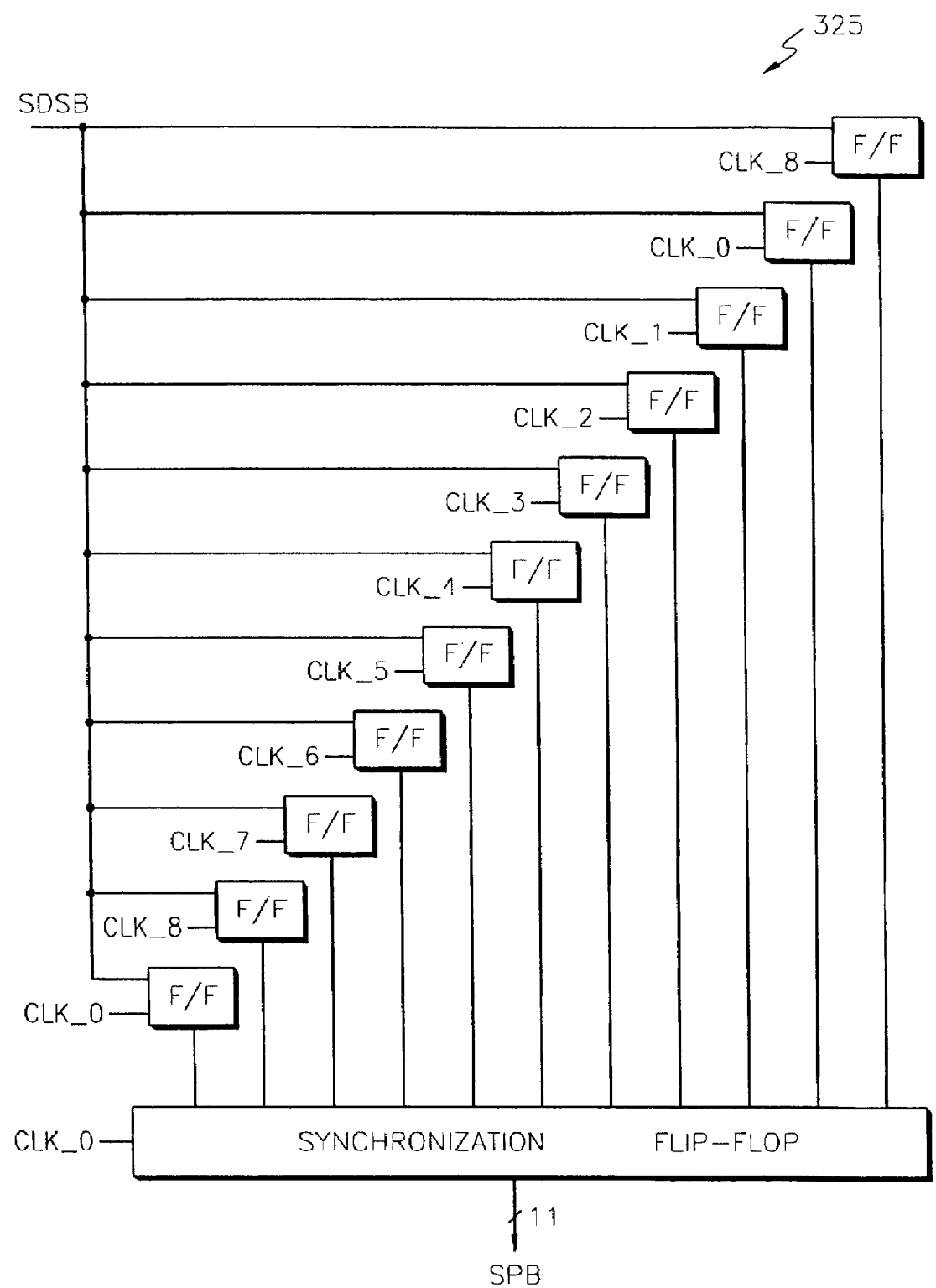
FIG. 14 is a circuit diagram of the deserializer shown in FIG. 13.

FIG. 14 is a circuit diagram of the deserializer shown in FIG. 13. In FIG. 14, deserializers 321, 323 and 325 include multiple flip-flops and synchronization flip-flops. Because such deserializers 321, 323 and 325 are common in the art, explanation of their operation will be omitted.

The aligner 345 converts the eleven-bit output signal (SPB) of the deserializer 325 into 9-bit data (AB OR ASYNC) in response to the clock signal (CLK__7), with the skew in the 9-bit data (AB) being corrected. The output signal (ASYNC) of the aligner 345 should not be the same as DSYNC. Therefore, the encoder 245 shown in FIG. 11 encodes the blue video signal (B[7:0]) into the DC-balanced blue data (DSB) using the algorithm shown in FIG. 9.

Figure 15:
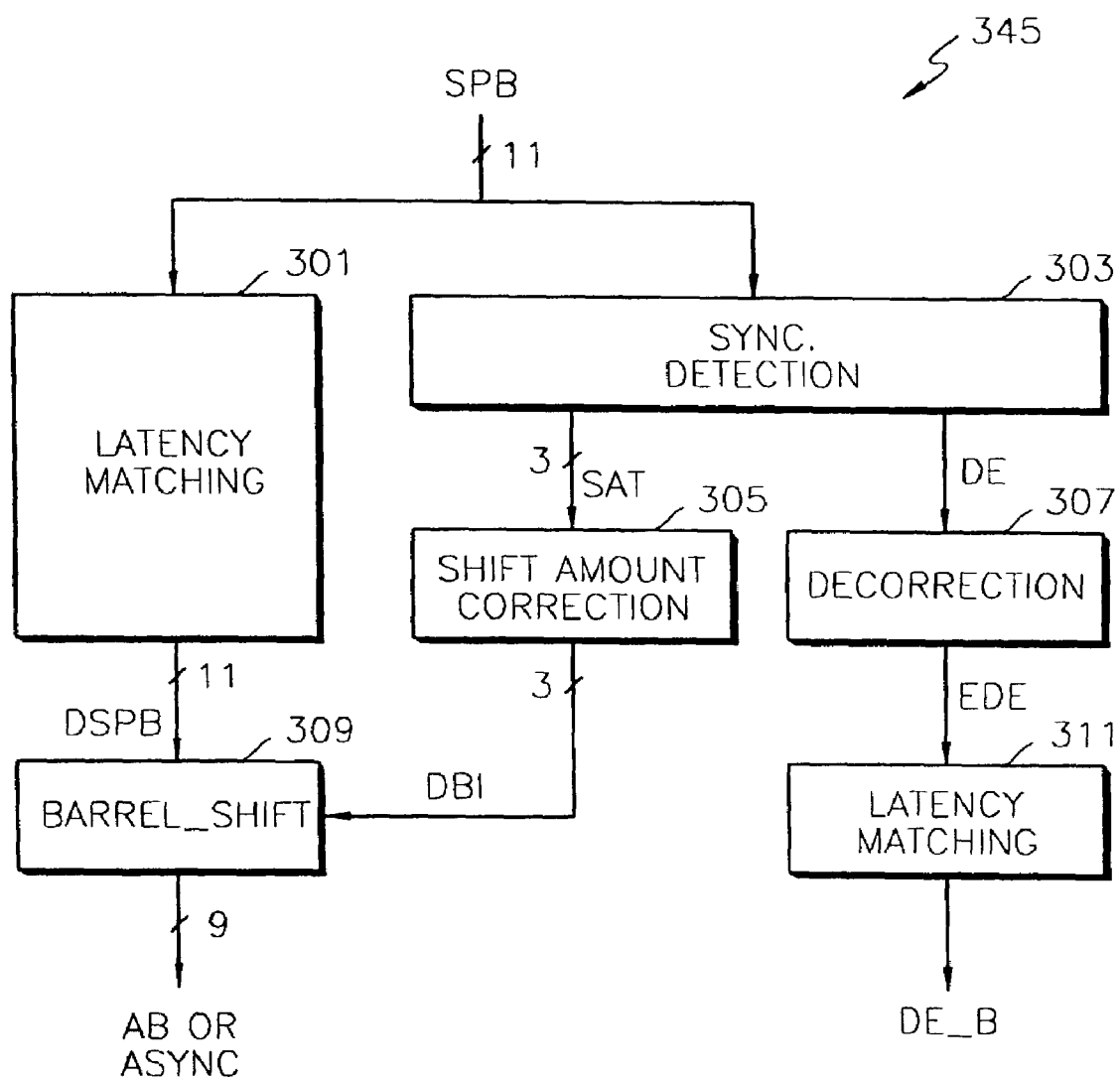
FIG. 15 is a circuit diagram of the aligner shown in FIG. 13.

FIG. 15 is a circuit diagram of the aligner shown in FIG. 13. As shown in FIG. 15, the aligner 345 includes a synchronization code detection circuit 303, a first latency matching circuit 301, a barrel shifter 309, a shift amount correction circuit 305, a DE correction circuit 307, and a second latency matching circuit 311.

Figure 17:
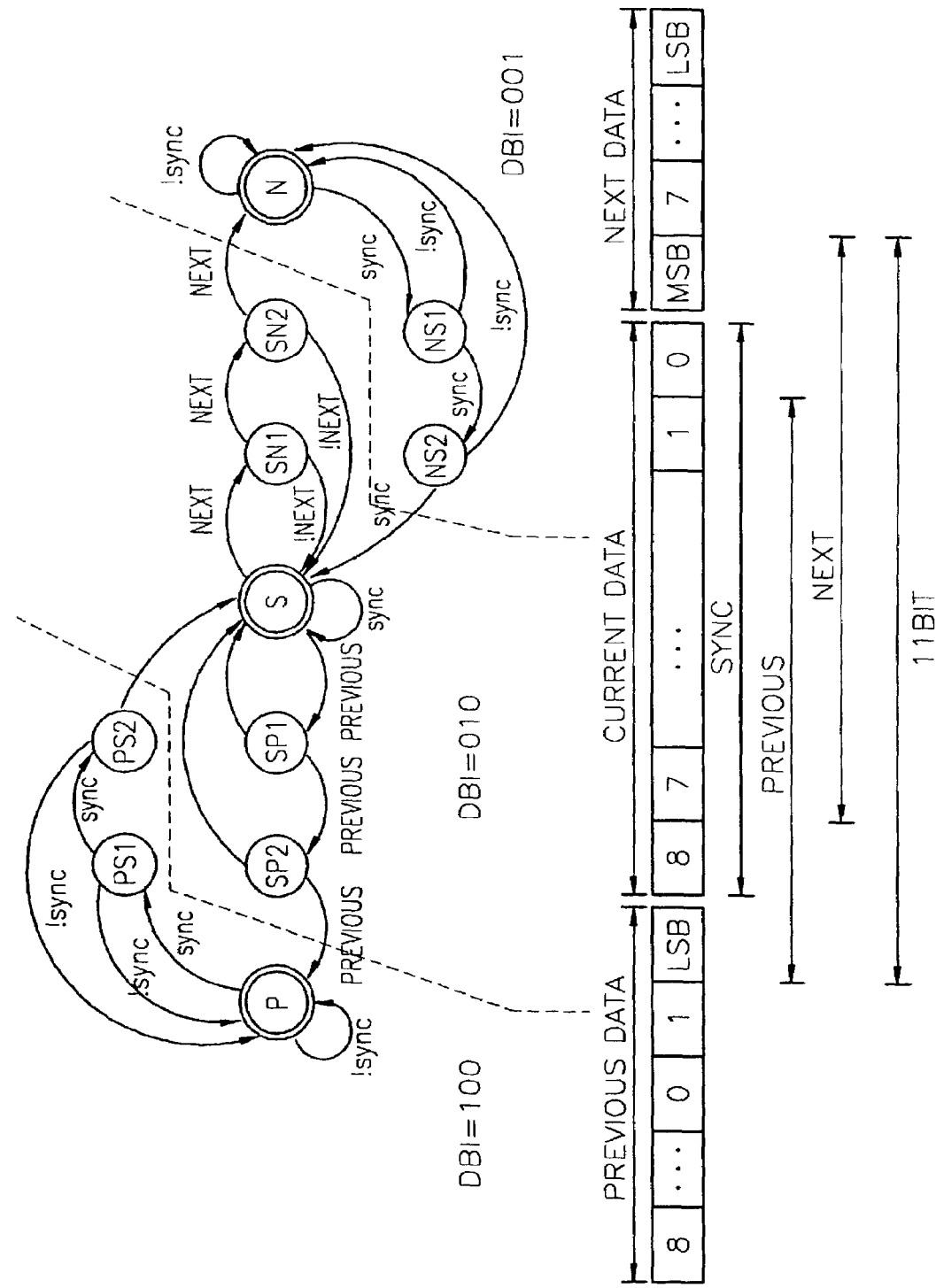
FIG. 17 is a state diagram showing the characteristics of a shift amount correction circuit 305.

The synchronization code detection circuit 303 receives the output signal (SPB) of the deserializer 325 and detects the DSYNC signal included in the SPB as shown in FIG. 6. That is, the synchronization code detection circuit 303 generates 9-bit blocks (for example, the boundaries of DSYNC are SYNC, PREVIOUS and NEXT.) out of 11 bits (SPB) as shown in FIG. 17, and detects the DSYNC signal shown in FIG. 6.

When the synchronization code detection circuit 303 detects the DSYNC signal out of the received 11 bits (SPB), it outputs a data enable DE signal at logic "Low" to the DE correction circuit 307.

In addition, the synchronization code detection circuit 303 outputs the boundary status of DSYNC, that is, 3-bit boundary information (SAT) including SYNC, PREVIOUS and NEXT signals, to the shift amount correction circuit 305.

The status of the SYNC, PREVIOUS and NEXT signals, which indicate the boundary of the DSYNC signal, will be described in detail with reference to FIG. 17.

The first latency matching circuit 301 is a pre-defined delay circuit. The circuit is designed to match the output time of the output signal (DSPB) of the first latency matching circuit 301 with that of the output signal (DBI) of the synchronization code detection circuit 303 and the shift amount correction circuit 305.

The barrel shifter 309 outputs the ASYNC signal in response to the output signal of the shift amount correction circuit 305. The shift amount correction circuit 305 corrects the error of the output signal (SAT) of the synchronization code detection circuit 303, and the DE correction circuit 307 corrects the error of the data enable signal DE. The second latency matching circuit 311 is a delay circuit designed to match the output timing of the output signal of the barrel shifter 309 with that of the output signal of the DE correction circuit 307.

Figure 16:
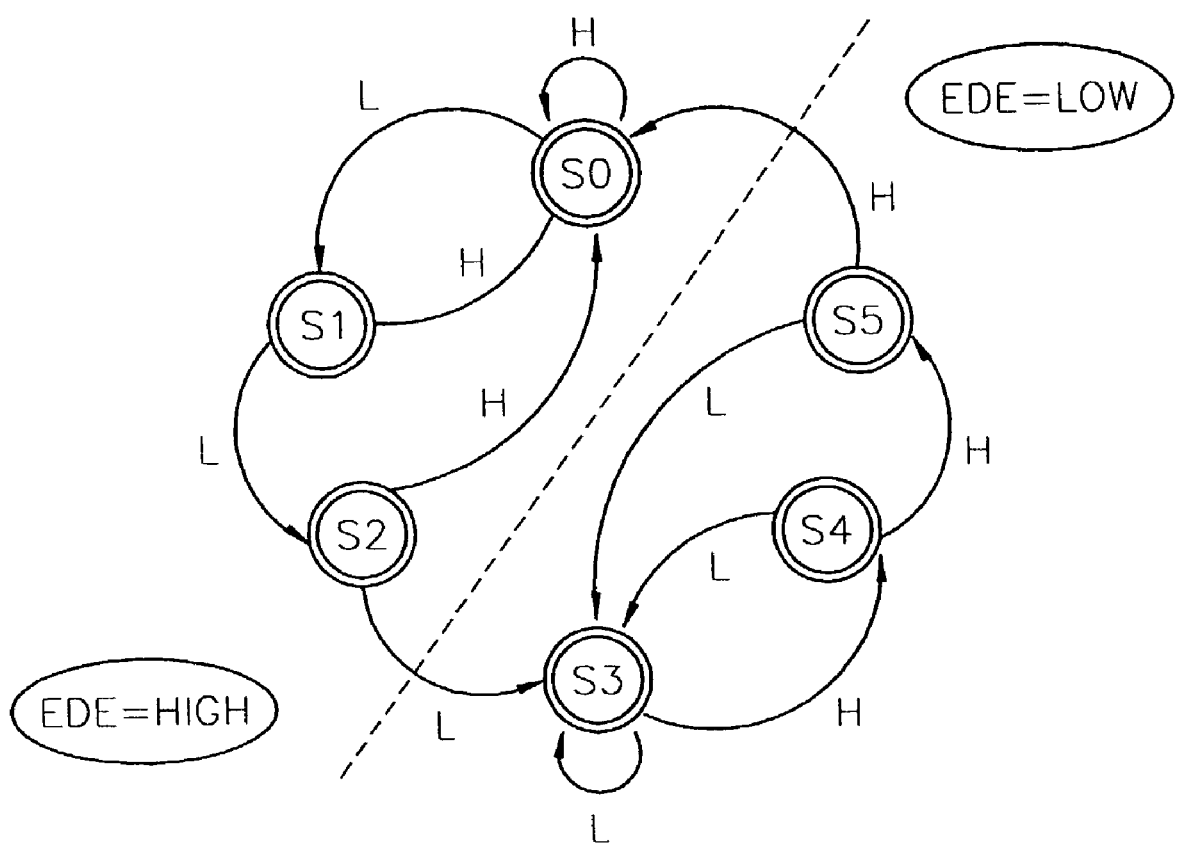
FIG. 16 is a state diagram showing output signals of a data enable signal (DE) correction circuit.

FIG. 16 is a state diagram showing output signals of a data enable DE signal correction circuit, according to DE. With reference to FIGS. 15 and 16, states S0 and S3 indicate a stable status. In states S0, S1 and S2, the error-corrected data enable signal (EDE) indicates a logic "High". In states S3, S4 and S5, EDE indicates a logic "Low".

For example, if the data enable DE input in state S0 is low (L), then the state changes from S0 to S1. If the DE input in state S1 is low (L), then the state changes from S1 to S2. In addition, if the DE input in state S2 is low (L), then the state changes from S2 to S3. Therefore, EDE has a logic "Low".

That is, if the same logic value of the data enable DE signal is input to the DE signal correction circuit 307 three times consecutively, then the state of the output signal EDE is changed.

However, if the data enable DE signal input in state S0 is low (L), then the state changes from S0 to S1. If the DE input in state S1 is low (L), then the state changes from S1 to S2. If the DE input in state S2 is high (H), then the state changes from S2 to S0. Therefore, EDE maintains the original stable state (S0). As a result, errors in the data enable DE signal can be corrected according to the above procedures.

FIG. 17 is a state diagram showing the characteristics of a shift amount correction circuit 305. In FIG. 17, the symbol "!" is a Verilog operator indicating the logical operator NOT.

The states P, S and N indicate stable states. When the shift amount correction circuit 305 is operating in states P, PS1 or PS2, it outputs the shift amount control signal (DBI) of a binary value 100 to the barrel shifter 309. When the shift amount correction circuit 305 is in states S, SP1, SP2, SN1 or SN2, it outputs the error-corrected shift amount control signal (DBI) of a binary value 010 to the barrel shifter 309. When the shift amount correction circuit 305 is in states N, NS1 or NS2, it outputs the error-corrected shift amount control signal (DBI) of a binary value 001 to the barrel shifter 309.

The output of the shift amount control signal (DBI) is described in detail with reference to FIGS. 15 and 17. It is assumed that the shift amount correction circuit 305 is in a stable state S.

If the boundary of the received first data element is PREVIOUS, then the synchronization code detection circuit 303 outputs 100, the boundary information (SAT) indicating PREVIOUS, to the shift amount correction circuit 305. In response to PREVIOUS, the shift amount correction circuit 305 changes from state S to SP1.

If the boundary of the second data element is input sequentially after the first data element is PREVIOUS, then the synchronization code detection circuit 303 outputs 100, the boundary information (SAT) indicating PREVIOUS, to the shift amount correction circuit 305. In response to PREVIOUS, the shift amount correction circuit 305 changes from state SP1 to SP2.

If the boundary of the third data element is input sequentially after the second data element is PREVIOUS, then the synchronization code detection circuit 303 outputs 100, the boundary information (SAT) indicating PREVIOUS, to the shift amount correction circuit 305. In response to PREVIOUS, the shift amount correction circuit 305 changes from state SP2 to P.

Here, since P is a stable state, the shift amount correction circuit 305 finally outputs 100, the shift amount control signal (DBI) indicating PREVIOUS, to the barrel shifter 309.

In response to the shift amount control signal (DBI) of a value 100, the barrel shifter 309 outputs 9 bits having PREVIOUS as a boundary out of the output signals (DSPB) of the first latency matching circuit 301. The 9 bits comprise a skew-corrected DSYNC signal.

In FIG. 17, in the case where the boundary information (SAT) is input to the shift amount correction circuit 305 three times consecutively in the same state, the state S changes to N or P. Therefore, according to the state diagram shown in FIG. 17, errors can be corrected.

With reference to FIGS. 13 and 15, the channel synchronizer circuit 360 removes skew between the aligner 345 and the output signal (AB) in response to the clock signal (CLK_7), and outputs the data without any skew to the decoder 380.

The decoder 385 decodes the DSYNC signal, which is the output signal of the aligner 345, and demodulates the output signals (B[7:0], VSYNC, HSYNC and DE) of the controller.

Figure 18:
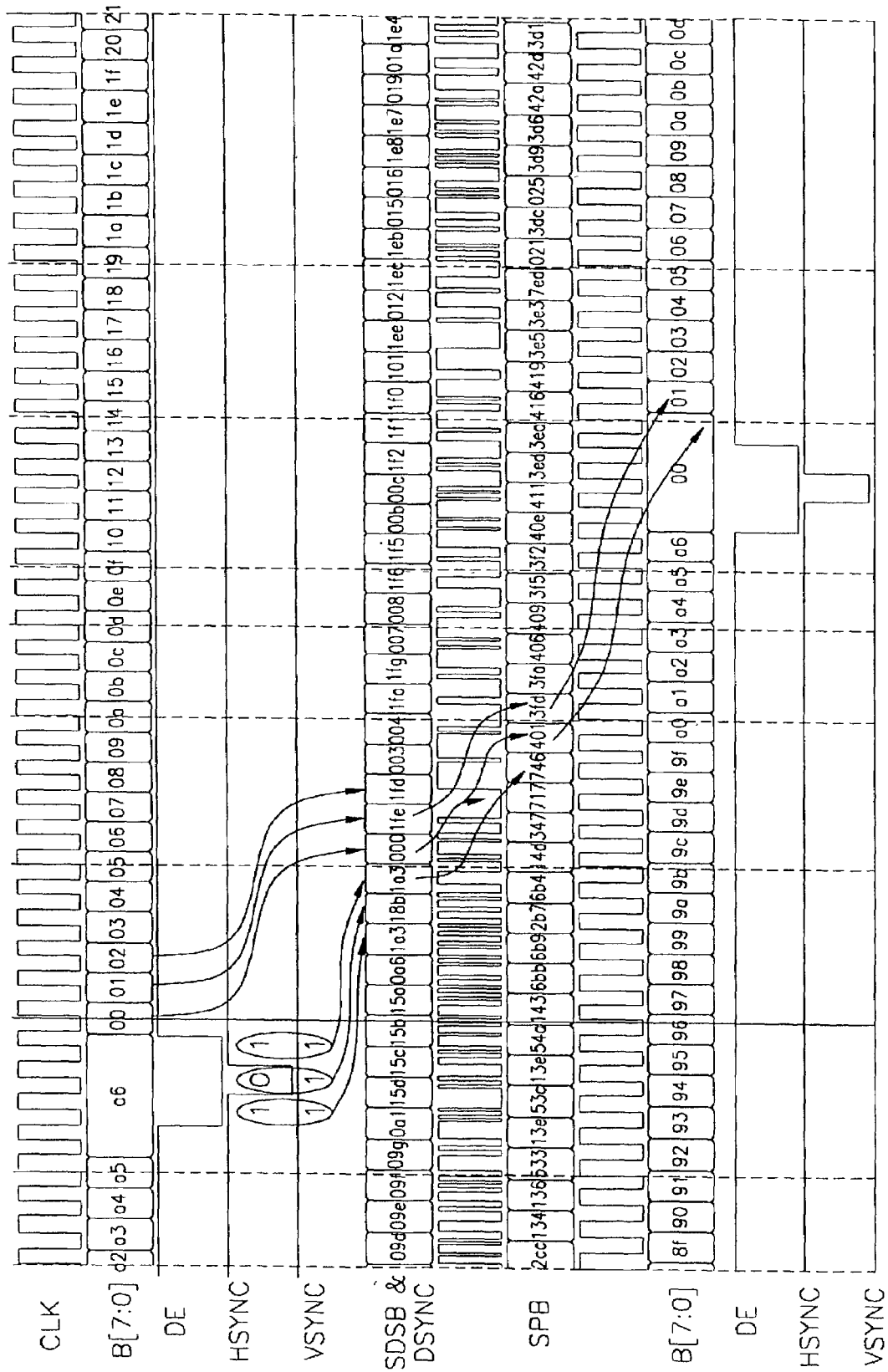
FIG. 18 is a timing diagram showing the wave forms of the inputs and outputs of the signal transmission system according to one embodiment of the present invention.

FIG. 18 is a timing diagram showing the wave forms of the inputs and outputs of the signal transmission system according to one embodiment of the present invention. Since the bits shown in FIG. 18 indicate hexadecimal numbers, additional subscripts are not used.

With reference to FIGS. 6, 11, 13 and 18, if HSYNC is 0 and VSYNC is 1, then DSYNC is 18b. Or, if HSYNC is 1 and VSYNC is 1, then DSYNC is 1a3.

FIG. 18 will be described in detail with reference to the flow chart shown in FIG. 9. If the blue video signal (B[7:0]) is 00, the DC-balanced data (SDSB) of 00 is 000. If the blue video signal (B[7:0]) is 01, the DC-balanced data (SDSB) of 01 is 1fe.

In addition, if the blue video signal (B[7:0]) is 0f, the DC-balanced data (SDSB) of 0f is 1f0.

The deserializer 325 of FIG. 13 generates 11-bit parallel data including the LSB of the previous data, the current serial data stream, and the MSB of the following data. For example, the 11-bit output signal 746 of the deserializer 325 includes the LSB of the data 18$b$, the current data 1$a$3 and the MSB of the following data 000.

The 11-bit data 401 of the deserializer 325 includes the LSB of the previous data (1$a$3), the current data (000), and the MSB of the following data (1$fe$). In addition, the 11-bit data (3$fd$) of the deserializer 325 includes the LSB of the previous data (000), the current data (1$fe$), and the MSB of the following data (1$fd$).

The aligner 345 of FIG. 15 corrects the skew of (+) 1 bit or (−) 1 bit in response to the output signal (SPB) of the desenalizer 325, and finally outputs the 9-bit data (B[7:0]) to the channel synchronizer circuit 360. That is, the decoder 385 demodulates the blue video signal (B[7:0]) from the encoded 8 bits in response to the output signal of the channel synchronizer circuit 360.

The decoder 385 outputs the demodulated HSYNC signal, the demodulated VSYNC signal and the demodulated data enable signal (DE).

That is, the decoder 385 demodulates the output signal of the controller 2 according to the MSB of the 9-bit data input to the decoder 385, using the algorithm used in the encoder 245. Therefore, in the system and the method for transmitting the DC-balanced data and DSYNC over one channel using the process according to one embodiment of the present invention, the DC-balanced data and DSYNC input to the receiver 300 are not the same.

As described above, in the video signal transmission system according to one embodiment of the present invention, even though the DC-balanced data and DSYNC are transmitted over a single channel, they are not the same. If the encoding process is used according to one embodiment of the present invention, the receiver receives different DC-balanced data and DSYNC. Therefore, the advantage of the present invention is that the data rate of the video signal transmission system can be reduced.

While this invention has been particularly shown and described with reference to preferred embodiments thereof, it will be understood by those skilled in the art that various changes in form and details may be made therein without departing from the spirit and scope thereof as defined by the appended claims.

What is claimed is:

1. A video signal transmission method comprising:
    encoding a binary video signal and a pre-defined binary synchronization signal, generated according to the logic status of first control signals, into first DC-balanced binary data and second DC-balanced binary data, respectively;
    converting the first DC-balanced binary data and second DC-balanced binary data into a first serial binary data stream and a second serial binary data stream, respectively, and transmitting the first and second serial binary data streams over a first optical channel of an optical transmission system;
    detecting third binary data and fourth binary data by correcting skew of the first serial binary data stream and the second serial binary data stream received through the first optical channel; and
    encoding and transmitting the first binary data so that the second binary data and the third binary data are different;

wherein the binary video signal and the pre-defined binary synchronization signal include N bits, where N is a natural number, and the first binary data through the fourth binary data each include (N+M) bits, where M is a natural number.

2. The video signal transmission method of claim 1, wherein the first serial binary data stream is transmitted over the first optical channel in response to an activated second control signal, and the second serial binary data stream is transmitted over the first optical channel in response to a deactivated second control signal.

3. The video signal transmission method of claim 2, further comprising:
   decoding the third binary data and the fourth binary data and detecting the first binary data, the second binary data, the first control signals and the second control signal.

4. The video signal transmission method of claim 3, wherein when the third binary data is detected, the second control signal is activated, and when the fourth binary data is detected, the second control signal is deactivated.

5. A data transmission method comprising:
   converting multiple first binary data and multiple second binary data into a first serial binary data stream and a second serial binary data stream, respectively, and transmitting the first and second binary data streams over a first optical channel of an optical transmission system, transmitting the first binary data over the first optical channel in response to an activated control signal, and transmitting the second binary data over the first optical channel in response to a deactivated control signal;
   detecting third binary data by correcting skew of the first serial binary data stream and the second serial binary data stream received through the first optical channel;
   including (N+M) bits, where N and M are natural numbers, in the first binary data through the third binary data; and
   encoding and transmitting the multiple first binary data so that the multiple second binary data and the third binary data are different.

6. The video signal transmission method of claim 5, further comprising:
   decoding the third binary data and detecting the first binary data, the second binary data and control signals.

7. The data transmission method of claim 6, wherein if the third binary data is the same as that of the multiple first binary data, the control signal remains activated, and if the third binary data is the same as the multiple second binary data, the control signal remains deactivated.

8. A video signal transmission method comprising:
   encoding an R/G/B binary video signal into a DC-balanced R/G/B binary video signal and transmitting the DC-balanced binary R/G/B video signal over R/G/B optical channels of an optical transmission system when a data enable signal is activated;
   converting a pre-defined binary synchronization code corresponding to control signals into a DC-balanced binary synchronization code signal and transmitting DC-balanced synchronization code over one of the R/G/B optical channels when the data enable signal is deactivated; and
   receiving the DC-balanced R/G/B binary video signal and DC-balanced binary synchronization code, correcting skew of the DC-balanced R/G/B binary video signal, and transmitting the skew-corrected R/G/B binary video signal; and
   encoding the DC-balanced R/G/B binary video signal so that the skew-corrected R/G/B binary video signal and DC-balanced binary synchronization code are different,
   wherein the DC-balanced R/G/B binary video signal and the DC-balanced binary synchronization code include N bits, where N is a natural number, and the R/G/B binary video signal, the DC-balanced binary synchronization code, and the skew-corrected R/G/B binary video signal include (N+M) bits, where M is a natural number.

9. A video signal transmission system comprising:
   an encoding circuit for encoding a binary video signal and a pre-defined binary synchronization signal generated according to the logic status of first control signals into first DC-balanced binary data and second DC-balanced binary data, respectively;
   a converting circuit for converting the first binary data and the second binary data into a first serial binary data stream and a second serial binary data stream, respectively;
   a first optical channel of an optical transmission system for transmitting the first serial binary data stream and the second serial binary data stream; and
   a detection circuit for detecting third binary data and fourth binary data by correcting skew of the first serial binary data stream and the second binary serial data stream received through the first optical channel,
   wherein the encoding circuit encodes the first binary data so that the second binary data and the third binary data are not the same, and
   wherein the binary video signals and the pre-defined binary synchronization signal include N bits, where N is a natural number, and the first binary data through the fourth binary data include (N+M) bits, where M is a natural number.

10. The video signal transmission system of claim 9, wherein the first serial binary data stream is transmitted over the first optical channel in response to an activated second control signal, and the second serial binary data stream is transmitted over the first optical channel in response to a deactivated second control signal.

11. The video signal transmission system of claim 10, further comprising:
    a decoding circuit for decoding the third binary data and fourth binary data and detecting the first binary data, the second binary data, the first control signals and the second control signal.

12. The video signal transmission system of claim 11, wherein if the third binary data is detected, then the second control signal is activated, and if the fourth binary data is detected, then the second control signal is deactivated.

13. A data transmission system comprising:
    a converting circuit for converting multiple first binary data and multiple second binary data into a first serial binary data stream and a second serial binary data stream, respectively;
    a first optical channel of an optical transmission system for transmitting the first serial binary data stream and the second serial binary data stream, the first binary data is transmitted over the first optical channel in response to an activated control signal and the second binary data is transmitted over the first optical channel in response to a deactivated control signal; and a first detection circuit for detecting third binary data by correcting skew of the first serial binary data stream and the second serial binary data stream received through the first optical channel, wherein an encoding circuit encodes and transmits the multiple first binary data so that the multiple second binary data and the third binary data are not the same, and wherein the first binary data through the third binary data include (N+M) bits, where N and M are natural numbers.

14. The data transmission system of claim 13, further comprising:

a second detection circuit for decoding the third binary data and detecting the first binary data, the second binary data and control signals.

15. The data transmission system of claim 14, wherein if the third binary data is the same as the multiple first binary data, then the control signal remains activated, while if the third binary data is the same as the multiple second binary data, then the control signal remains deactivated.

* * * * *